Nov. 29, 1955

M. BRODSKY 2,725,434

AUTOMATIC INDICATING DEVICE OF LOSSES OF
PRESSURE OF INNER TUBES OF TIRES

Filed July 17, 1951

INVENTOR.
MARCOS BRODSKY

BY Richards & Geier

ATTORNEYS

United States Patent Office 2,725,434
Patented Nov. 29, 1955

2,725,434
AUTOMATIC INDICATING DEVICE OF LOSSES OF PRESSURE OF INNER TUBES OF TIRES

Marcos Brodsky, Buenos Aires, Argentina

Application July 17, 1951, Serial No. 237,138

2 Claims. (Cl. 200—61.26)

The present invention relates to an automatic indicating device, chiefly consisting in the adequate combination of means to detect, at the right moment, any eventual and accidental losses of air in inner tubes, such as in the particular case of punctures.

One feature of this invention consists in providing a device to be placed between the inner tube and the tire, where two contacts are arranged in a way to close the electric circuit with the supply of the electric current of the internal installation of the vehicle, one contact being movable with respect to the other one, and its elasticity permitting to displace itself, when a depression in the inner tube occurs, originated by losses on account of punctures, thus electrically uniting with the fixed contact and closing the electric circuit between the supply of the electric current stored in the interior of the vehicle, and a luminous or sonorous alarm device.

Another feature of this invention consists in providing a device to be placed between the inner tube and the tire, for the provision of adequate means to maintain the separation between the movable contact and the fixed one, while the inner tube is in its normal state of functioning.

In order that the present invention may be fully understood and readily performed in practice, reference is made to the accompanying drawings, wherein.

Figure 1:
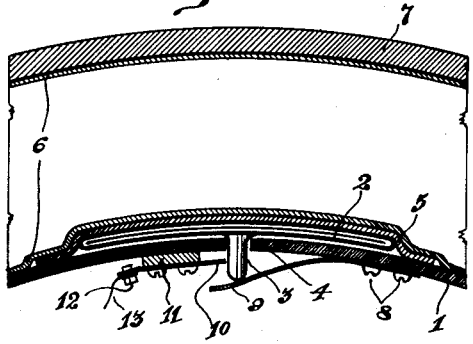
Figure 1 is a lateral view of the section of the rim, when the device is placed in its normal position, i. e. when the air inside the inner tube is at the due pressure, with the contacts separated.

With reference to the drawings attached, number 1 indicates the rim of the wheel, inside which a resilient and arched metal plate 2 is placed, having a central piston-rod 3 at a right angle, penetrating the rim through the opening 4 overhanging the exterior part of the rim. The metal plate 2 is covered by a protection strip 5, on which the inner tube 6 rests, adjusted against the tire 7.

Figure 3:
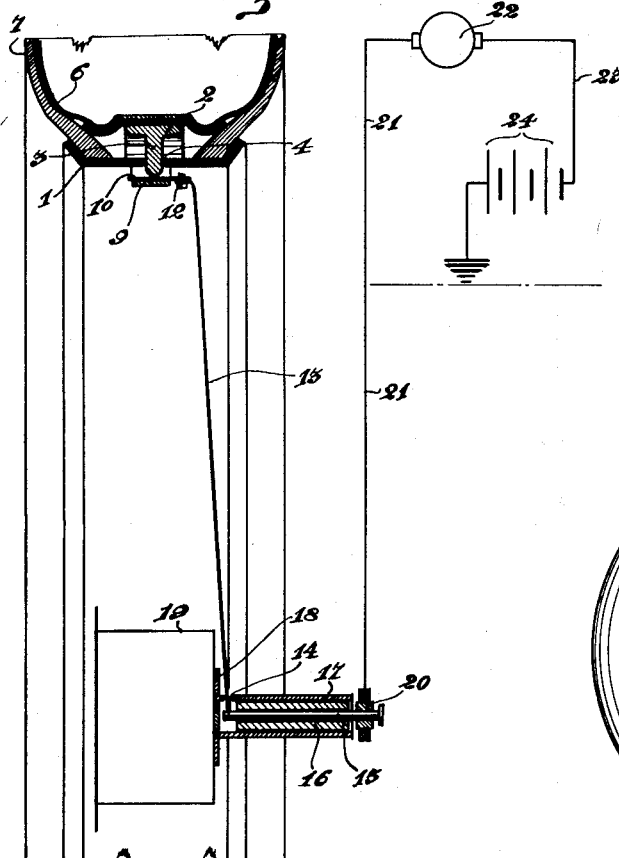
Figure 3 is a transversal view of the rim, as per plan A—B of Figure 2, showing the electric connection with the alarm device.
Figure 4:
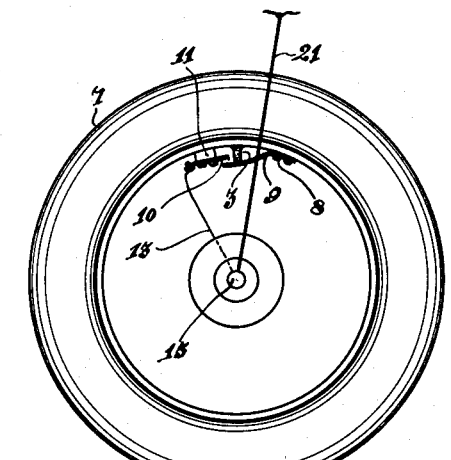
Figure 4 is a lateral schematic view of a wheel bearing the alarm device.

On the exterior part of the rim 1, an elastic contact 9 is secured at point 8, and in front of it another contact 10 is also fixed on the rim 1, insulated by insertion of the piece 11. Said contact 10 bears a cable 13 secured at 12, conducting as it is shown in Figure 3, to the connection 14 on the end of the rod 15, which has a cover 16 of insulating material, such as rubber, and is encased in a bearing jacket 17, which is secured by a bead 18 to the cup of the wheel. The rod 15 is placed in line with the axle of the wheel, rotating together with this latter.

On the other end of the rod 15, a friction-contact 20 of the carbon brush type or a similar one, is freely mounted, bearing a cable 21, which is fixed on the body or chassis of the car. Said cable is connected to a visual or aural alarm device 22 and from there it conducts, as indicated in Figure 3 by conductor 23, up to the feeding battery 24.

The performance of the device is quite simple and made self-evident by the drawings. Under normal conditions, when the inner tube has the right pressure, this pressure impulses the elastic plate 2 to the position as indicated in Figure 1, thus permitting the piston-rod 3, which is placed against the elastic contact 9, to separate the same from the contact 10, i. e. to leave the circuit of the current interrupted, and consequently, the alarm device out of action.

Figure 2:
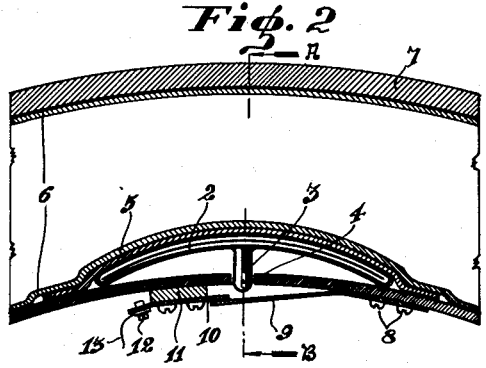
Figure 2 is a view similar to that of Figure 1, but showing the position of the elements, when the air pressure has sufficiently decreased so as to permit the union of the contacts, closing the electric circuit.

If by any circumstance, however, the air pressure in the inner tube decreases below the admissible limit, the plate 2 bends by its own elastic reaction, as indicated in Figure 2, which causes the piston-rod 3 to lean its free end against the other contact 10, thus closing the circuit of the current of the battery 24. Said circuit is closed in the following way: One of the terminals of the battery is connected by the conductor 23 to the alarm 22, and from there by the cable 21 to contact 20, rod 15, by cable 13 to the union 12 of contact 10, which is placed against elastic contact 9, which makes ground through the rim 1, thus closing the circuit and calling the attention of the driver by actuating alarm 22, giving the driver a chance to control the emergency by stopping the car and repairing the damage. In this way, the tire is prevented from being damaged, as generally occurs, when the driver becomes aware only too late of the danger.

As it will easily be understood, the elastic plate 2 may be of different elasticity and resistance, which makes this kind of device especially applicable to the wheels of any type of vehicle, by using plates calculated to bend according to the different pressures.

The above description evidently corresponds to a practical performance of the alarm device, which does not exclude the introduction of eventual modifications within the principle on the basis of which the device has been described.

I claim:

1. An electric switch responsive to pressure variations in the inner tube of a tire on the rim of a wheel, the switch comprising an arched resilient plate disposed over an opening in the rim intermediate the inner tube and the rim, a rod disposed on said plate and slidable through the opening, a resilient contact disposed on the rim and coacting with said rod, a fixed insulated contact disposed on the rim and coacting with the resilient contact.

2. An electric switch responsive to pressure variations in the inner tube of a tire on the rim of a wheel, the rim having an opening formed therein; the switch comprising an inwardly arched resilient plate disposed over the opening intermediate the inner tube and the rim, the resiliency of said plate being correlated with the predetermined pressure of the inner tube, a rod slidably inserted through the opening, means for securing one end of said rod to said plate with the free end in spaced radial arrangement with the rim, a resilient contact for the rim, means for securing one end of said contact to the rim with the free end in operable engagement with said rod when the pressure of the inner tube is substantially around the predetermined pressure thereof, a fixed insulated contact disposed in the rim, said fixed contact being in operable engagement with said resilient contact when the pressure of the inner tube is substantially below the predetermined pressure thereof.

References Cited in the file of this patent

UNITED STATES PATENTS

| | | |
|---|---|---|
| 1,294,923 | Long | Feb. 18, 1919 |
| 1,410,297 | Harman | Mar. 21, 1922 |
| 1,736,534 | Jensen | Nov. 19, 1929 |
| 1,862,473 | Fitzgerald | June 7, 1932 |
| 1,984,084 | Rodney | Dec. 11, 1934 |
| 2,205,168 | Guthrie | June 18, 1940 |
| 2,215,153 | Hull | Sept. 17, 1940 |
| 2,313,247 | Krow | Mar. 9, 1943 |